(12) United States Patent
Schreiber et al.

(10) Patent No.: US 8,849,325 B2
(45) Date of Patent: Sep. 30, 2014

(54) DETERMINATION OF MAXIMAL INDEPENDENT SETS OF MOBILE DEVICES

(75) Inventors: Robert Samuel Schreiber, Palo Alto, CA (US); Terence P. Kelly, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 465 days.

(21) Appl. No.: 13/283,653

(22) Filed: Oct. 28, 2011

(65) Prior Publication Data

US 2013/0109419 A1 May 2, 2013

(51) Int. Cl.
| | |
|---|---|
| *H04B 7/00* | (2006.01) |
| *H04B 7/26* | (2006.01) |
| *H04M 1/00* | (2006.01) |
| *H04W 4/08* | (2009.01) |
| *H04L 29/12* | (2006.01) |
| *H04W 52/02* | (2009.01) |
| *H04W 40/24* | (2009.01) |
| *H04W 40/32* | (2009.01) |
| *G06F 1/32* | (2006.01) |
| *H04W 84/18* | (2009.01) |
| *H04L 29/08* | (2006.01) |

(52) U.S. Cl.
CPC ............... *H04B 7/26* (2013.01); *H04W 40/248* (2013.01); *H04W 40/246* (2013.01); *H04W 40/32* (2013.01); *G06F 1/32* (2013.01); *H04M 1/00* (2013.01); *H04W 4/08* (2013.01); *H04W 84/18* (2013.01); *H04L 67/04* (2013.01); *H04L 61/00* (2013.01); *H04W 52/0219* (2013.01)
USPC ........... 455/500; 455/518; 455/519; 455/517; 455/550.1; 455/445; 370/310; 370/328; 370/329; 370/338; 370/343

(58) Field of Classification Search
CPC . H04W 40/246; H04W 40/248; H04W 40/32; H04W 84/18
USPC ......... 455/500, 518, 519, 517, 550, 509, 507, 455/508, 514, 445, 426.1, 426.2, 422.1, 455/403; 370/310, 328, 329, 338, 343
See application file for complete search history.

(56) References Cited

U.S. PATENT DOCUMENTS

| | | |
|---|---|---|
| 5,210,753 A | 5/1993 | Natarajan |
| 6,973,053 B1 | 12/2005 | Passman et al. |
| 2008/0232389 A1 | 9/2008 | Wu et al. |
| 2008/0247353 A1 | 10/2008 | Pun |
| 2009/0037529 A1 | 2/2009 | Armon-Kest et al. |

(Continued)

OTHER PUBLICATIONS

Bevan Das and Vaduvur Bharghavan, "Routing in Ad-Hoc Networks Using Minimum Connected Dominating Sets," International Conference on Communications, Jun. 1997, IEEE International Conference on Communications, 1997, vol. 1, pp. 376-380.

(Continued)

*Primary Examiner* — Keith Ferguson
(74) *Attorney, Agent, or Firm* — Kilpatrick Townsend & Stockton LLP

(57) ABSTRACT

Example embodiments disclosed herein relate to the determination of maximal independent sets (MISs) of mobile devices. Example embodiments include participating with other mobile devices of a plurality of mobile devices in concurrent distributed determinations of a plurality of MISs of the mobile devices and selecting one of the plurality of MISs.

15 Claims, 6 Drawing Sheets

(56) References Cited

U.S. PATENT DOCUMENTS

| | | | |
|---|---|---|---|
| 2009/0276154 | A1 | 11/2009 | Subramanian et al. |
| 2010/0110996 | A1 | 5/2010 | Tao et al. |
| 2010/0214945 | A1 | 8/2010 | Wu et al. |
| 2010/0329162 | A1* | 12/2010 | Kadous et al. ............... 370/310 |

OTHER PUBLICATIONS

Bevan Das et al., "Routing in Ad Hoc Networks Using a Spine," Proceeding of Sixth International Conference on Computer Communications and Networks, Sep. 22-25, 1997, Las Vegas, Nevada, pp. 34-39.

Fabian Kuhn et al., "Fast Deterministic Distributed Maximal Independent Set Computation on Growth-Bounded Graphs," In. Proceedings of the 19th Int. Symposium on Distributed Computing (DISC), 2005, pp. 1-15.

Frank H.P. Fitzek et al., "Cellular Controlled Short-Range Communication for Cooperative P2P Networking," Wireless Personal Communications: An International Journal, vol. 48 Issue 1, Jan. 2009, pp. 1-5, Kluwer Academic Publishers, USA.

Heesook Choi et al., "SET: Detecting Node Clones in Sensor Networks," In SecureComm '07, 2007, pp. 1-10.

John Paul Carlson, "Coordinated Energy Efficient Neighbor Discovery," Thesis, Submitted in partial fulfillment of the requirements for the degree of Master of Science in Computer Science in the Graduate College of the University of Illinois at Urbana-Champaign, 2011, pp. 1-38, Available at: <ideals.illinois.edu/bitstream/handle/2142/26203/Carlson_John.pdf?sequence=1>.

Jong-Woon Yoo and Kyu Ho Park, "A Cooperative Clustering Protocol for Energy Saving of Mobile Devices with WLAN and Bluetooth Interfaces," IEEE Transactions on Mobile Computing, vol. 10, No. 5, Apr. 2011, pp. 491-504, IEEE.

Khaled M. Alzoubi et al., "Message-Optimal Connected Dominating Sets in Mobile Ad Hoc Networks," Proceedings of the 3rd ACM Int. Symposium on Mobile Ad Hoc Networking and Computing (MOBIHOC), 2002, pp. 157-164, EPFL, Lausanne, Switzerland.

Leonid Barenboim and Michael Elkin, "Sublogarithmic Distributed MIS Algorithm for Sparse Graphs using Nash-Williams Decomposition," Twenty-Seventh Annual ACM SIGACT-SIGOPS Symposium on Principles of Distributed Computing (PODC), Aug. 18-21, 2008, Toronto, Ontario, Canada, 2008, pp. 1-10.

Loscri, V. Morabito, G. Marano, S., "A two-levels hierarchy for low-energy adaptive clustering hierarchy (TL-LEACH)," Vehicular Technology Conference, 2005. VTC-2005-Fall. 2005 IEEE 62nd, Issue Date: Sep. 25-28, 2005, vol. 3, On pp. 1809-1813, Date of Current Version: Jan. 16, 2006.

Raghupathy Sivakumar et al., "The Clade Vertebrata: Spines and Routing in Ad Hoc Networks," ISCC '98 Proceedings, Third IEEE Symposium, Jun. 30-Jul. 2, 1998, Computers and Communications, 1998, pp. 599-605.

Rajiv Misra and Chittaranjan Mandal, "Rotation of CDS via Connected Domatic Partition in Ad Hoc Sensor Networks," IEEE Transactions on Mobile Computing, vol. 8, No. 4, Apr. 2009, pp. 488-499.

Samuel Madden et al., "TAG: a Tiny AGgregation Service for Ad-Hoc Sensor Networks," Appearing in 5th Annual Symposium on Operating Systems Design and Implementation (OSDI), Boston, MA, Dec. 2002, pp. 1-16.

Sayan Mitra and Jesse Rabek, "Energy Efficient Connected Clusters for Mobile Ad Hoc Networks," 3rd Annual Mediterranean Ad Hoc Networking Workshop (MEDHOC-NET), 2004, pp. 386-397.

Seema Bandyopadhyay and Edward J. Coyle, "An Energy Efficient Hierarchical Clustering Algorithm for Wireless Sensor Networks," INFOCOM 2003, Twenty-Second Annual Joint Conference of the IEEE Computer and Communications, Mar. 30-Apr. 3, 2003, IEEE, 2003, pp. 1713-1723.

Srinivasan Parthasarathy and Rajiv Gandhi, "Distributed Algorithms for Coloring and Domination in Wireless Ad Hoc Networks," Foundations of Software Technology and Theoretical Computer Science, 2004, pp. 447-459.

Stefan Dulman et al., "Leader Election Protocol for Energy Efficient Mobile Sensor Networks (EYES)," Jun. 2002, pp. 1-12, Available at: <www.ub.utwente.nl/webdocs/ctit/1/00000090.pdf>.

Stefano Basagni, "Finding a Maximal Weighted Independent Set in Wireless Networks," Telecommunication Systems 18:1-3, 2001, pp. 155-168, Kluwer Academic Publishers, The Netherlands.

Thanh Dai Tran and Johnson I. Agbinya, "Controlled Link Establishment Attack on Key Pre-Distribution Schemes for Distributed Sensor Networks and Countermeasures," Security of Self-Organizing Networks: MANET, WSN, WMN, VANET; Chapter 17, 2011, pp. 409-436, Taylor and Francis Group, LLC.

Thomas Moscibroda and Roger Wattenhofer, "Efficient Computation of Maximal Independent Sets in Unstructured Multi-Hop Radio Networks," Proceedings of 1st IEEE International Conference on Mobile Ad-Hoc and Sensor Systems (MASS), 2004, pp. 1-9.

Panconesi et al., "Improved distributed algorithms for coloring and network decomposition problems," in Proc. of the 24th annual ACM Symposium on Theory of computing (STOC), 1992, pp. 581-592, ACM Press.

W.R. Heinzelman et al., "Energy-Efficient Communication Protocol for Wireless Microsensor Networks," Proceedings of the 33rd Hawaii International Conference on System Sciences—2000, Jan. 2000, pp. 1-10, IEEE.

Xu Jianbo et al., "An Energy-Aware Distributed Clustering Algorithm in Wireless Sensor Networks," 2008 International Conference on Computer Science and Software Engineering, CSSE, 2008, vol. 3, pp. 528-531.

\* cited by examiner

DETERMINATION OF MAXIMAL INDEPENDENT SETS OF MOBILE DEVICES

BACKGROUND

A mobile computing device such as a notebook computer, tablet computer, mobile phone, or smart device may be powered by a portable energy source, such as at least one battery, fuel cell, etc. The operation of such a device may be limited by the life of the energy source. Accordingly, appropriate power management of the device may be beneficial for extending the life of the energy source and the operation of the device.

BRIEF SUMMARY

In some implementations, a target mobile device, of a plurality of mobile devices, includes a communication interface to communicate with at least one neighbor mobile device of the plurality of mobile devices, wherein the target and neighbor mobile devices each have a first identifier of a first identifier assignment for the plurality of mobile devices. The target mobile device also includes a maximal independent set (MIS) controller. The MIS controller generates, based on at least identifier generation information, a second identifier for each of the target and neighbor mobile devices, wherein the second identifiers are part of a second identifier assignment for the plurality of mobile devices. The MIS controller also participates, with the other of the plurality of mobile devices via the communication interface, in concurrent distributed determinations of first and second MISs of the plurality of mobile devices based on the first and second identifier assignments, respectively. The MIS controller additionally selects one of the first and second MISs as a set of representatives.

In some implementations, the MIS controller selects one of the first and second MISs based on a selection communication received, via the communication interface, from one of the at least one neighbor mobile devices.

In some implementations, the target mobile device also includes a computing resource and the MIS controller is further configured to utilize the computing resource in response to a utilization request from one of the at least one neighbor mobile devices, if the target mobile device is a member of the selected MIS, and provide a utilization request to a member of the selected MIS, if the target mobile device is a constituent of the selected MIS.

In some implementations, to participate in the distributed determination of the first and second MISs, the MIS controller, for each of the identifier assignments, stores an MIS status for the target mobile device, stores a number of outstanding status communications for the target mobile device, and provides the MIS status to a receiving neighbor of the at least one neighbor mobile devices.

In some implementations, to participate in the distributed determination of the first and second MISs, the MIS controller, for each of the identifier assignments, receives, from a sending neighbor mobile device of the at least one neighbor mobile device via the communication interface, a status communication, and updates at least one of the MIS status and the number of outstanding status communications in accordance with the received status communication.

In some implementations, a non-transitory machine-readable storage medium is encoded with instructions executable by a processor of a target mobile device of a plurality of mobile devices. The storage medium includes instructions to store a principal identifier for each of the target mobile device and at least one neighbor mobile device of the plurality of mobile devices, wherein the principal identifiers are part of a principal identifier assignment. The storage medium also includes instructions to generate, based on identifier generation information and the principal identifiers, a plurality of alternative identifiers including, for each of a plurality of alternative identifier assignments, alternative identifiers for the target and neighbor mobile devices. The storage medium additionally includes instructions to cause the target mobile device to interact with the at least one neighbor mobile device to contribute to concurrent distributed determinations, by the plurality of mobile devices, of a plurality of maximal independent sets (MISs) of the plurality of mobile devices based on a collection of identifier assignments including the alternative identifier assignments and the principal identifier assignment. The storage medium further includes instructions to select one of the plurality of MISs as a set of representatives.

In some implementations, the storage medium also includes instructions to provide, from the target mobile device to one of the at least one neighbor mobile devices, a combined status communication including first and second MIS statuses for first and second identifier assignments of the collection of identifier assignments, respectively.

In some implementations, the combined status communication includes an indication that the first MIS status is associated with the first identifier assignment and an indication that the second MIS status is associated with the second identifier assignment.

In some implementations, the plurality of MISs have an order, the instructions to select one of the plurality of MISs comprise instructions to cycle through the plurality of MISs, in order, in response to successive selection triggers, and the instructions to cause the target mobile device to interact with the at least one neighbor mobile device include instructions to store an MIS status for the target mobile device for each of the collection of identifier assignments and instructions to store a number of outstanding status communications for the target mobile device for each of the collection of identifier assignments.

In some implementations, the identifier generation information includes a plurality of modifiers each associated with one of the alternative identifier assignments, and wherein, the instructions to generate the alternative identifiers include instructions to concatenate one of the plurality of modifiers with each of the primary identifiers to generate a plurality of salted identifiers, for each of the alternative identifier assignments, and instructions to take a hash of each of the salted identifiers to generate the alternative identifiers for the target and neighbor mobile devices, for each of the alternative identifier assignments.

In some implementations, a method includes storing, on a target mobile device of a plurality of mobile devices, a principal identifier for each of the target mobile device and at least one neighbor mobile device of the plurality of mobile devices. The method also includes generating, with the target mobile device based on identifier generation information and the principal identifiers, a plurality of alternative identifiers including, for each of a plurality of alternative identifier assignments, an alternative identifier for each of the target and neighbor mobile devices. The method additionally includes communicating with each of the at least one neighbor mobile devices, after generating the alternative identifiers, to advance concurrent distributed determinations, by the plurality of mobile devices, of a plurality of maximal independent sets (MISs) of the plurality of mobile devices based on at least the alternative identifier assignments.

In some implementations, selecting the first MIS includes selecting the first MIS based on at least the number of members in each of the plurality of MISs.

In some implementations, the method also includes providing a resource utilization request to a member of the first MIS, if the target mobile device is a constituent of the first MIS. The method additionally includes receiving a resource utilization request from a constituent of the first MIS, if the target mobile device is a member of the first MIS. The method further includes providing cached information to the constituent in response to receiving the resource utilization request.

In some implementations, the method includes determining whether to select another MIS of the plurality of MISs. The method also includes selecting a second MIS of the plurality of MISs as a second set of representatives for the plurality of mobile devices, if the result of the determination is to select another MIS.

In some implementations, selecting the second MIS includes selecting, as the second MIS, an MIS of the plurality of MISs having the fewest number of members in common with the first MIS.

BRIEF DESCRIPTION OF THE DRAWINGS

The following detailed description references the drawings, wherein.

DETAILED DESCRIPTION

Figure 1:
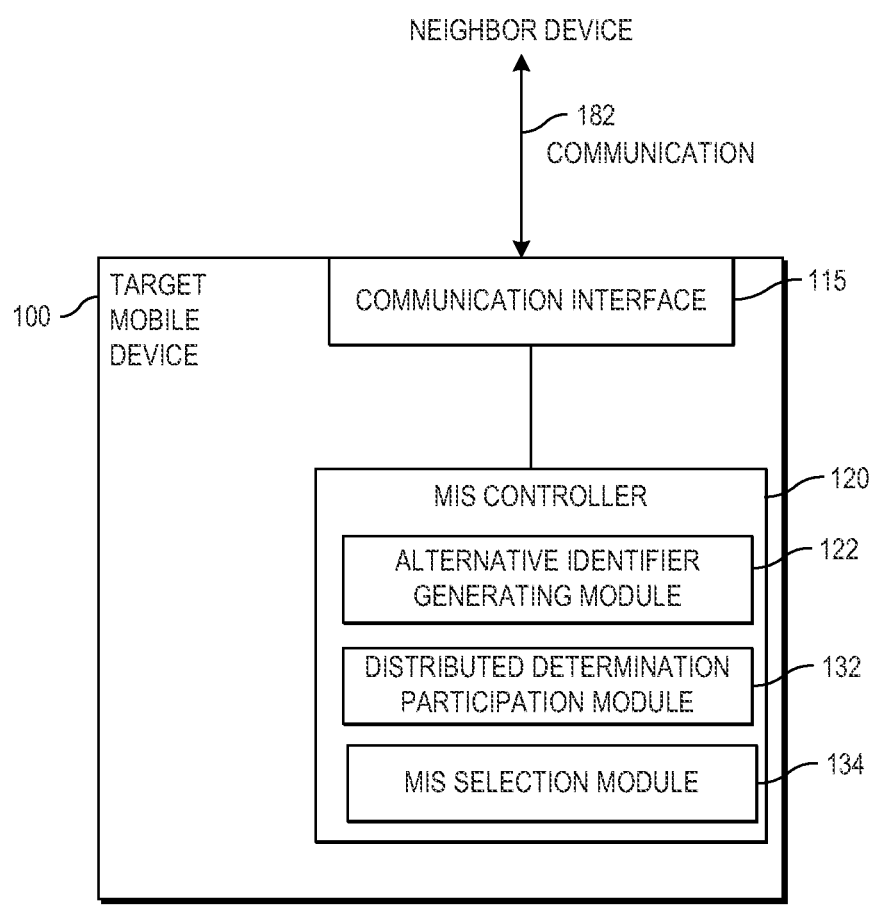
FIG. 1 is a block diagram of an example target mobile device to participate in distributed maximal independent set (MIS) determinations.

As noted above, appropriate power management may be beneficial for extending the life of a mobile device's portable energy source, such as at least one battery, at least one fuel cell, or the like. Some mobile device functionalities, such as global positioning system (GPS) and wireless networking functionalities, may use power at a higher rate than other functionalities, such as short-range or personal area network (PAN) communication functionalities. Moreover, extended usage of one of the high-power functionalities may drain the portable energy source of a mobile device at an unacceptably high rate.

To address these issues, examples disclosed herein may enable a mobile device to conserve power by using low-power communication to collaborate with other mobile devices in the performance of a more power-intensive functionality. In such examples, a plurality of mobile devices may select a subset of the devices as representatives. The representatives may perform the power-intensive functionality for itself and any mobile device able to communicate with the representative via low-power communication. In some examples, the representatives may cache information obtained via the power-intensive functionality, which may be provided to other mobile devices when requested. Additionally, having representatives perform certain functionalities for non-representatives in accordance with examples described herein may reduce the heat generation of the non-representatives, and may reduce the amount of wear the non-representatives would experience by performing those functionalities, and the like.

In examples disclosed herein, a plurality of mobile devices may select the representatives in a distributed manner, with each mobile device contributing to the collective determination of which mobile devices are to be the representatives. For example, the mobile devices may be considered vertices of a connected graph having an edge between vertices if the mobile devices represented by the vertices are able to communicate bi-directionally via low-power communication (e.g., short-range radio). An independent set of the graph is a subset of the vertices in which no two members of a subset are adjacent (i.e., connected by an edge). Moreover, an independent set is a maximal independent set (MIS) if the independent set is not a subset of any larger independent set of the vertices. In an MIS, no two members of the MIS are adjacent to one another, and each non-member is adjacent to at least one member of the MIS. As such, an MIS of the vertices of the graph representing the plurality of mobile devices may be an appropriate set of representatives for the plurality of mobile devices.

In some examples, the plurality of mobile devices may determine an MIS of the mobile devices in a distributed manner, and then utilize the mobile devices that are members of the MIS as representatives for performing the power-intensive functionality. In this manner, many of the mobile devices may conserve power by allowing the representatives to perform the power-intensive functionality for them and receiving results from the representatives via lower-power communication.

Additionally, examples disclosed herein may enable a mobile device to participate with other devices in concurrent distributed determinations of a plurality of MISs of the mobile devices. In such examples, a smallest MIS of the plurality of MISs determined may then be selected as the set of representatives. By selecting a small MIS, fewer devices of the plurality may perform the power-intensive functionality, so that more of the mobile devices may conserve power. Moreover, a distributed determination of the plurality of MISs may be faster and more efficient than one device learning all vertices and edges in a graph representing the plurality of mobile devices and then having that one device determine the plurality of MISs.

Referring now to the drawings, FIG. 1 is a block diagram of an example target mobile device 100 to participate in distributed maximal independent set (MIS) determinations. As used herein, a "mobile device" is a mobile phone, a smart device (e.g., a smartphone), a slate or tablet computer, a notebook computer, or any other computing device having a communication interface and a portable energy source capable of powering the device. A mobile device may also be referred to herein as a "mobile computing device". In the example of FIG. 1, target mobile device 100 includes a communication interface 115, and an MIS controller 120.

As used herein, a "communication interface" is at least one hardware component that may be used by a mobile device to perform low-power communication with another mobile device. Additionally, as used herein, "low-power communication" may be any type of short-range radio communication (e.g., utilizing short wavelength radio communication, Bluetooth®, etc.), or any other type of short-range, point-to-point communication having relatively low power consumption.

In some examples, target mobile device 100 is one mobile device of a plurality of mobile devices. In such examples, the plurality of mobile devices may be a connected plurality of mobile devices in which, for each pair of mobile devices of the plurality, the mobile devices of the pair may communicate with one another directly via low-power communication or through the low-power communication of at least one other mobile device of the plurality. In some examples, each of the plurality of mobile devices may include a communication interface and an MIS controller, as described in relation to target mobile device 100. As used herein, a first mobile device of the plurality of mobile devices may be considered a "neighbor" in relation to a second mobile device of the plurality if the first and second mobile devices are able to communicate with one another directly via respective communication interfaces of the first and second mobile devices. In the example of FIG. 1, target mobile device 100 may utilize communication interface 115 to communicate with at least one neighbor of the plurality of mobile devices.

In some examples, each of the plurality of mobile devices has a principal identifier. As used herein, an "identifier" is any value or data structure for which there exists a static order of identifiers of the same type. For example, an identifier may be a number, an alphanumeric value, or the like. In some examples, a device's principal identifier may be a serial number of the mobile device, another unique identification number for the mobile device, or the like. Additionally, the principal identifiers of each of the plurality of mobile devices may collectively form a principal identifier assignment. As used herein, an "identifier assignment" is a one-to-one mapping of a plurality of identifiers to a plurality of mobile devices in which an identifier assignment for a plurality of mobile devices includes a unique identifier for each of the mobile devices.

In some examples, an identifier assignment may include only identifiers of the same type (e.g., numbers, etc.). Moreover, because identifiers have a static order, a mobile device may compare its identifier to the identifier of one of its neighbors to determine whether, for a given identifier assignment, its identifier is greater than or less than the neighbor's identifier. A neighbor of a mobile device having a greater identifier than the mobile device, for a given identifier assignment, is referred to herein as a "higher neighbor" for that identifier assignment. Additionally, a neighbor of a mobile device having a lower identifier than the mobile device, for a given identifier assignment, is referred to herein as a "lower neighbor" for that identifier assignment.

In some examples, target mobile device 100 may discover its neighbors among the plurality of mobile devices by using communication interface 115 to discover mobile devices within the range of communication interface 115. In such examples, target mobile device 100 may receive a principal identifier from each of its neighbors and store the principal identifiers of its neighbors in addition to storing its own principal identifier.

In the example of FIG. 1, MIS controller 120 includes modules 122, 132, and 134. In other examples, MIS controller 120 may include additional modules to perform additional functionality. In some examples, the functionality of modules of MIS controller 120 may each be implemented in the form of executable instructions encoded on a machine-readable storage medium, in the form of electronic circuitry, or a combination thereof. In the example of FIG. 1, alternative identifier generating module 122 may generate an alternative identifier for target mobile device 100 and each of its neighbors based at least in part on identifier generation information.

As used herein, "identifier generation information" is any information that may be used to generate identifiers for a mobile device. In some examples, identifier generation information may be a plurality of salt values (e.g., a sequence of numbers). In such examples, module 122 may generate an alternative identifier for a mobile device by concatenating one of the salt values to the device's principal identifier to generate a salted identifier, and then taking a hash of the salted identifier. In such examples, module 122 may generate an alternative identifier for target mobile device 100 and each of its neighbors using the same salt value. In this manner, module 122 may determine alternative identifiers for the neighbors of target mobile device 100 without any communication with the neighbors after receiving their principal identifiers. The alternative identifiers generated for target mobile device 100 and its neighbors may be part of an alternative identifier assignment for the plurality of mobile devices.

Moreover, in some examples, each mobile device of the plurality of mobile devices may generate and store alternative identifiers for itself and its neighbors as described above in relation to module 122. In such examples, all mobile devices may have the identifier generation information stored thereon and may use the same salt value to generate the alternative identifiers. As such, each mobile device may generate and store the same alternative identifier for itself that its neighbors generate for it. In this manner, each of the mobile devices may store the principal identifiers for itself and its neighbors for the principal identifier assignment and the alternative identifiers for itself and its neighbors for the alternative identifier assignment.

In the example of FIG. 1, after module 122 determines the alternative identifiers, distributed determination participation module 132 may participate in a distributed determination of first and second MISs of the plurality of mobile devices based on the principal and alternative identifier assignments, respectively. As noted above, the plurality of mobile devices may be considered vertices of a connected graph having an edge between vertices if the mobile devices represented by those vertices are able to communicate bi-directionally via low-power communication. Also, as used herein, an "MIS of a plurality of mobile devices" is a set of mobile devices among the plurality, wherein the set forms an MIS of the graph representing the plurality of mobile devices. Mobile devices that are part of the MIS may be referred to herein as "members" of the MIS, and mobile devices that are not part of the MIS may be referred to herein as "constituents" of the MIS. Moreover, as used herein, a "determination" of an MIS of a plurality of mobile devices is a determination of which of the plurality of mobile devices are members of the MIS and which are constituents.

In some examples, an MIS of the plurality of mobile devices may be determined in a distributed manner by the plurality of mobile devices based on a given identifier assignment of the plurality of mobile devices. In such examples, the determination may proceed in the following manner. As described above, each mobile device may store its own identifier and the identifiers of each of its neighbors, for the given identifier assignment. Moreover, each mobile device may determine, for each of its neighbors, whether the neighbor is a higher neighbor or a lower neighbor for the given identifier assignment. To determine the MIS, each mobile device may await status communications from its higher neighbors (if any), determine its MIS status (i.e., member or constituent) based on the MIS status of at least one of its higher neighbors (if any), and communicate its MIS status to its lower neighbors (if any) once determined. As used herein, an "MIS status" of a mobile device is an indication of whether the mobile device is a member of an MIS for a given identifier assignment, a constituent of an MIS for the given identifier assignment, or undeclared for the given identifier assignment. A mobile device has an "undeclared" MIS status for a given identifier assignment before it declares itself to be either a member or constituent for the given identifier assignment. Additionally, as used herein a "status communication" is a communication including the MIS status of a mobile device providing the status communication.

For example, if a mobile device has no higher neighbors, the mobile device may declare itself to be a member of the MIS and notify its lower neighbors that it is a member. If a mobile device receives a communication indicating that one of its higher neighbors is a member, then the mobile device cannot also be a member, and the mobile device may declare itself to be a constituent and notify its lower neighbors that it is a constituent. If a mobile device has received communications from each of its higher neighbors and none is a member, then the mobile device may declare itself to be a member and notify its lower neighbors that it is a member. In this manner, the determination of an MIS for the given identifier assignment by the plurality of mobile devices is completed once the mobile device with the lowest identifier has declared its status. In the manner described above, the MIS of the plurality of mobile devices may be determined in a distributed manner by providing one status communication over each edge of the graph representing the plurality of mobile devices. In such examples, the distributed determination of the MIS is ongoing at least until a status communication has been provided over each edge of the graph.

While in many examples no mobile device is aware of the entire MIS when the distributed determination described above is completed, each mobile device is aware of a neighbor that is a member of the MIS, or knows that it is a member itself. Although the distributed determination of an MIS has been described above in the context of an example in which each node receives status communications from its higher neighbors and provides status communications to its lower neighbors, in other examples, each mobile device may receive status communications from its lower neighbors and provide status communications to its higher neighbors and may end when the mobile device with the highest identifier declares its status.

In the above example, the MIS is determined based on the identifiers of the identifier assignment used in the determination. As such, performing the above distributed determination based on different identifier assignments may produce different MISs of the plurality of mobile devices. In some examples, each mobile device of the plurality of mobile devices may generate and store alternative identifiers for itself and its neighbors as described above in relation to module 122. In such examples, the plurality of mobile devices may thereby collectively generate and store an alternative identifier assignment in addition to the principal identifier assignment. In such examples, each of the mobile devices may store the identifiers for itself and its neighbors for both the principal and the alternative identifier assignments.

In the example of FIG. 1, module 132 may participate in a distributed determination, by the plurality of mobile devices, of a first MIS of the plurality of mobile devices based on the principal identifier assignment, and in a distributed determination, by the plurality of mobile devices, of a second MIS of the plurality of mobile devices based on the alternative identifier assignment. In some examples, the plurality of mobile devices may perform the distributed determinations of the first and second MISs concurrently. In such examples, module 132 may participate with the other mobile devices via communication interface 115 in concurrent distributed determinations of first and second MISs of the plurality of mobile devices based on the first and second identifier assignments, respectively. As used herein, distributed determinations of a plurality of MISs based on a plurality of identifier assignments are "concurrent" if, for each of the identifier assignments, at least one mobile device is declared to be an MIS member before the MIS determination is completed for any of the identifier assignments. As used herein, an MIS determination is considered "completed" for a given identifier assignment once the MIS status for every mobile device has been declared as either member or constituent.

Additionally, in some examples, for the concurrent determinations of a plurality of MISs (e.g., first and second MISs) of the plurality of mobile devices, module 132 may await status communications 182 from its higher neighbors for each identifier assignment concurrently, declare the status of device 100 for each identifier assignment as the appropriate information is received, and provide status communications 182 to the lower neighbors of device 100 for each identifier assignment once it declares its status for that assignment. Status communications 182 may be provided to and received from neighbors via communication interface 115 of target mobile device 100. Additionally, in such examples, each of the other mobile devices of the plurality of mobile devices may also perform the functionality described above in relation to module 132 for the concurrent determinations of a plurality of MISs for the plurality of mobile devices. In this manner, the plurality of mobile devices may perform concurrent distributed determinations of a first MIS based on the principal identifier assignment and a second MIS based on the alternative identifier assignment.

In the example of FIG. 1, after the determination of the first and second MISs, module 134 may select one of the first and second MISs as a set of representatives for the plurality of mobile devices in any suitable manner. As used herein, a "representative" is a mobile device, of a plurality of mobile devices, that may perform a functionality on behalf of another mobile device of the plurality and provide results of the performance of the functionality to the other mobile device. In some examples, the functionality may be a power-intensive functionality, such as the utilization of GPS interface, the utilization of a wireless networking interface, or the like.

In some examples, after the first and second MISs are determined, module 134 may receive a selection communication 182 from another mobile device of the plurality of mobile devices via communication interface 115, and select the MIS indicated by the selection communication 182. In some examples, the selection communication 182 may be received from a neighbor of target mobile device 100. As used herein, an "MIS selector" is a mobile device of a plurality of mobile devices that may select at least one MISs of a plurality of MISs of the plurality of mobile devices on behalf of the mobile devices. In some examples, after the MISs are determined, the MIS selector may select one of the MISs and provide to all the other mobile devices a selection communication indicating the selected MIS. In some examples, the MIS selector may communicate to the other mobile devices either directly via low-power communication or through the low-power communication of at least one other mobile device of the plurality.

In some examples, one of the plurality of mobile devices, other than target mobile device 100, may be an MIS selector and may select one of the first and second MISs as a set of representatives for the plurality of mobile devices. In such examples, after selecting one of the MISs, the selector MIS may provide a selection communication 182, indicating the selected MIS, to each of the other mobile devices, including target mobile device 100. Each mobile device, including target mobile device 100, may know whether it or one of its neighbors is a representative for the selected MIS based on the declared status of target mobile device 100 and each of its neighbors for the selected MIS, which may be determined by module 132 during the distributed determination of the MISs.

In some examples, the MIS selector may be determined from among the plurality of mobile devices in any suitable manner. For example, the MIS selector may be determined based on the receipt of a request to utilize a functionality, where the request to utilize that functionality triggers the formation of an MIS. In some examples, one of the plurality of mobile devices may receive, from a user via a user interface of the mobile device, a request to utilize a GPS functionality, or any other power-intensive functionality. In such examples, the mobile device that receives the request from the user may declare itself to be the MIS selector, instruct the other of the plurality of mobile devices to determine a plurality of MISs of the mobile devices as described above, select one of the MISs, and communicate the selection to the other mobile devices.

In other examples, the MIS selector may be determined by any suitable leader election protocol before or after determining a plurality of MISs of the mobile devices. For example, the mobile device with the highest or lowest principal identifier may declare itself to be the MIS selector. In such examples, when the mobile device with the lowest principal identifier is to be the MIS selector, each mobile device may broadcast its principal identifier to its neighbors. Then, at each of a number of rounds, each mobile device may then broadcast any principal identifier it receives that is lower than any principal identifier it has previously broadcasted, including its own. After a sufficient number of rounds (e.g., equal to the diameter of the graph representing the plurality of mobile devices), the mobile device having a principal identifier equal to the smallest principal identifier it has seen may declare itself to be the MIS selector.

In some examples, the MIS selector may select one of the plurality of MISs based on features of and/or information about the MISs. For example, the features of the MISs may be the respective sizes of the MISs. In such examples, the MIS selector may select one of the MISs based on the respective sizes of the MISs. For example, the MIS selector may select an MIS having a smallest size among the MISs. In such examples, the MIS selector may obtain the size information by forming a routing tree or spanning tree of the mobile devices (i.e., of the graph representing the mobile devices) in which the MIS selector is the root of the tree.

The routing tree or spanning tree may be formed in any suitable manner. For example, if target mobile device 100 is the MIS selector, then module 134 may declare target mobile device 100 to be the root of the spanning tree and broadcast to its neighbors a communication requesting the formation of a spanning tree, indicating the principal identifier of target mobile device 100. Each mobile device that receives the communication and has not previously received a tree formation request may then set the mobile device from which it received the message as its parent, and send a similar communication to its neighbors, substituting its identifier into the request. The spanning tree has been formed once all mobile devices other than the root have a parent. In other examples, the tree formation request may further include the level in the tree of the sending mobile device (starting with a level of zero for the root). In such examples, when a mobile device receives a tree formation request, the receiving device may set the device from which it has received the request as the parent if the request includes the lowest level the receiving device has yet seen. The receiving device may then set its level to be one more than its parent's level, and then broadcast a tree formation request with its own level. In such examples, a mobile device may initially update its level and broadcast a tree formation request in response to the first tree formation request it receives, and subsequently update its level and broadcast another tree formation request each time it receives a request that includes the lowest level it has yet seen.

Moreover, in examples in which target mobile device 100 is the MIS selector, module 134 may request MIS size information from the other mobile devices after or concurrent with requesting formation of the spanning tree. In such examples, starting from target mobile device 100 (i.e., the root), each mobile device in the tree may request, from each of its children, the number of MIS members in the tree rooted at that child for each of the plurality of MISs. For each of the MISs, the mobile device may then add the number of MIS members received from each of its children, add one if it is a member, and provide the total to its parent. For each of the MISs, module 134 may then add the numbers received from its children and add one if target mobile device 100 is a member. In this manner, module 134 may determine the size of each of the plurality of MISs. In such examples, module 134 may then select an MIS having a smallest size among the plurality of MISs and then provide a selection communication 182 to the other mobile devices of the plurality.

In some examples, after selecting a first MIS, the MIS selector may select a second MIS of the plurality based on which of the MISs has the fewest mobile devices in common with the first MIS. In this manner, the mobile devices may more evenly spread the burden of being a representative. In such examples, the MIS selector may use a spanning tree formed as described above to obtain the size of the intersection of a pair of MISs. In such examples, for each of the MISs other than the first MIS, the MIS selector may request the intersection size for the first MIS and the other MIS. The MIS selector may then choose the MIS having the smallest intersection with the first MIS. As used herein, a "size" of an intersection is the number of mobile devices that a given pair of MISs has in common.

In some examples, the MIS selector may determine an intersection size for a given pair of MISs in the following manner. Starting from the root (e.g., the MIS selector), each mobile device in the tree may request, from each of its children, the number of mobile devices that are members of both MISs in the tree rooted at that child. Each mobile device may add the numbers received from each of its children, add one if it is a member of both MISs, and provide the total to its parent. In this manner, the MIS selector may obtain the intersection size by adding the numbers received from its children and adding one for itself if it is a member of both MISs.

In other examples, the MIS selector may use the spanning tree to request from each of the mobile devices an indication of which MISs the mobile device is a member of. In such examples, this membership information for each mobile device may be passed to the MIS selector via the spanning tree. In some examples, the MIS selector may then use this membership information to determine the MIS having the least mobile devices in common with the first MIS and select that MIS as a second MIS.

In examples described above, a mobile device may participate in concurrent distributed determinations of a plurality of MISs of the plurality of mobile devices. By determining a plurality of MISs, an MIS selector may select a smallest MIS among the determined MISs as the set of representatives so that more mobile devices can, for example, conserve power by not acting as a representative. Moreover, by determining the MISs in a distributed manner, the MISs may be determined concurrently and may be determined faster than if determined by a single one of the plurality of mobile devices.

Figure 2:
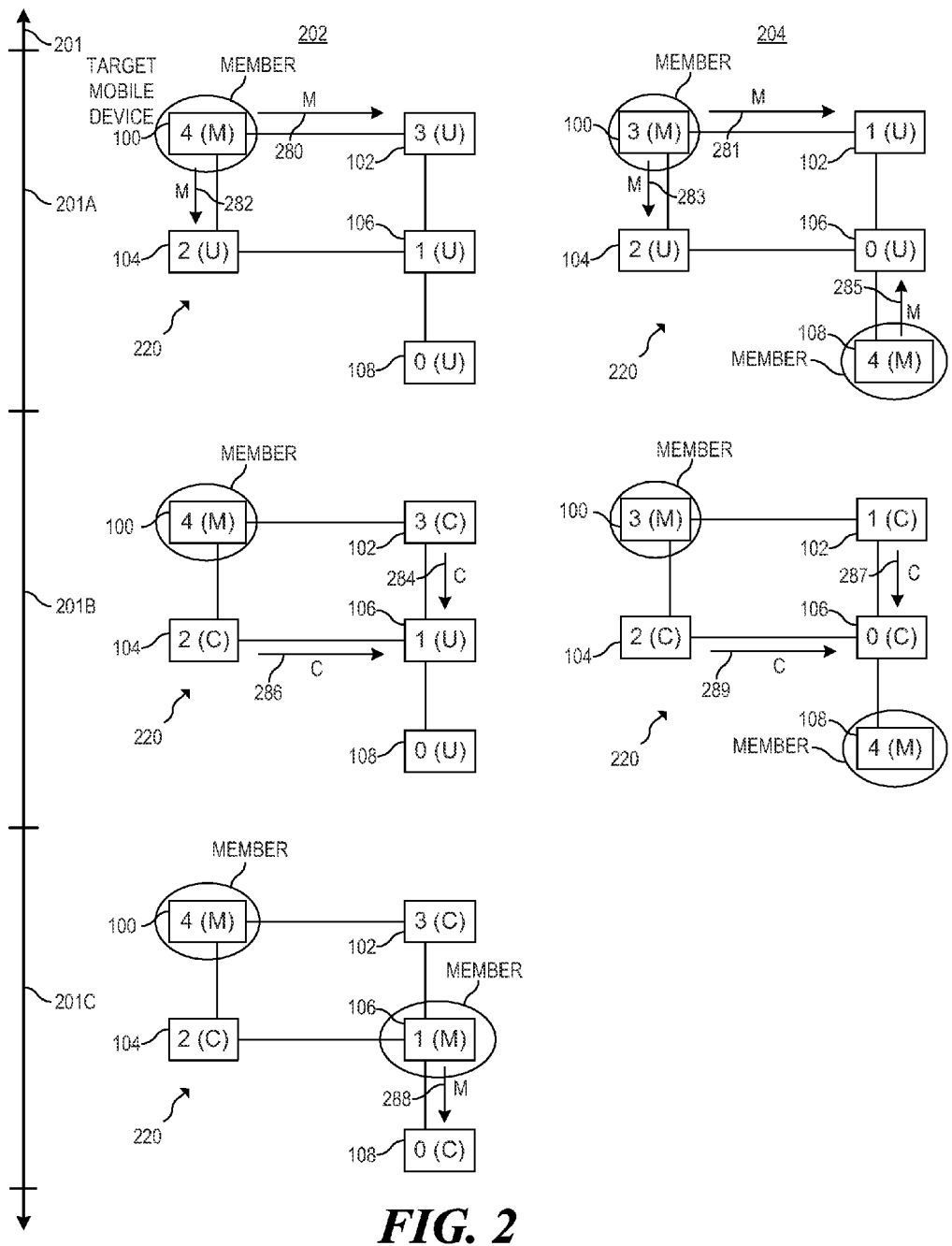
FIG. 2 includes two series of block diagrams for a plurality of mobile devices illustrating stages in example distributed determinations of two MISs of the mobile devices.

FIG. 2 includes two series of block diagrams for a plurality of mobile devices 220 illustrating stages in example distributed determinations of two MISs of the mobile devices 220. FIG. 2 illustrates a plurality of mobile devices 220 including target mobile device 100 of FIG. 1, and mobile devices 102, 104, 106, and 108. In FIG. 2, a series of block diagrams 202 illustrates a distributed determination of a first MIS for the plurality of mobile devices 220 based on a principal identifier assignment. Also in FIG. 2, a series of block diagrams 204 illustrates a distributed determination of a second MIS for the plurality of mobile devices 220 based on an alternative identifier assignment. In the example of FIG. 2, the first and second MIS may be determined concurrently by the plurality of mobile devices 220, as illustrated by timeline 201, having successive time periods 201A, 201B, and 201C.

In the example of FIG. 2, the principal and alternative identifier assignments both include numbers as identifiers. The principal identifier assignment includes principal identifiers 4, 3, 2, 1, and 0 for mobile devices 100, 102, 104, 106, and 108, respectively. The alternative identifier assignment includes alternative identifiers 3, 1, 2, 0, and 4 for mobile devices 100, 102, 104, 106, and 108, respectively. In FIG. 2, the identifier and MIS status for each mobile device are shown inside the blocks representing the mobile devices. The MIS status is shown in parentheses, with a "U" indicating an MIS status of undeclared, an "M" indicating an MIS status of member, and a "C" indicating an MIS status of constituent.

In the example of FIG. 2, the distributed determination of a first MIS of mobile devices 220 based on the principal identifier assignment may proceed as described above in relation to FIG. 1. An example of such a distributed determination of the first MIS, shown in FIG. 2 by the series of block diagrams 202, may proceed in the following manner.

As described above in relation to FIG. 1, each of the plurality of mobile devices 220 may store its own identifier and the identifiers of each of its neighbors, for the principal identifier assignment. Moreover, each of mobile devices 220 may determine, for each of its neighbors, whether the neighbor is a higher neighbor or a lower neighbor for the given identifier assignment. Then, to determine the first MIS, each of mobile devices 220 may await status communications from its higher neighbors (if any), determine its MIS status based on the MIS status of at least one of its higher neighbors (if any), and communicate its MIS status to its lower neighbors (if any) once determined.

For example, during time period 201A, target mobile device 100 may determine that it has no higher neighbors and therefore declare itself to be a member of the first MIS. After declaring itself to be member, target mobile device 100 may provide its MIS status (i.e., member) to its lower neighbors. For example, target mobile device 100 may provide a status communication 280 to mobile device 102 and a status communication 282 to mobile device 104, each indicating that target mobile device 100 is a member.

In such examples, during time period 201B, mobile device 102 may declare itself to be a constituent in response to status communication 280 indicating that one of its neighbors is a member. Similarly, mobile device 104 may declare itself to be a constituent in response to status communication 282 indicating that one of its neighbors is a member. Further, each of mobile devices 102 and 104 may provide a status communication to each of its lower neighbors after determining its status. In such examples, mobile device 102 may provide a status communication 284 to mobile device 106 indicating that mobile device 102 is a constituent, and mobile device 104 may provide a status communication 286 to mobile device 106 indicating that mobile device 106 is a constituent.

In some examples, during time period 201C, in response to status communications 284 and 286, mobile device 106 may determine that it has received a status communication from each of its higher neighbors, determine that none of its higher neighbors is a member, and declare itself to be a member in response to those determinations. Once mobile device 106 has declared its status, it may provide a status communication 288 to mobile device 108 to indicate that mobile device 106 is a member. In response, mobile device 108 may declare itself to be a constituent, since one of its neighbors is a member, Mobile device 108 has no lower neighbor to which to communicate its MIS status, and so the determination of the first MIS is complete, with the MIS members being mobile devices 100 and 106 and the other mobile devices being constituents.

An example of a distributed determination of a second MIS is shown in FIG. 2 by the series of block diagrams 204. Additionally, mobile devices 220 may concurrently determine the first and second MIS, as shown by timeline 201. In some examples, mobile devices 220 may determine the alternative identifiers of the alternative identifier assignment from the principal identifiers and identifier generation information, as described above in relation to FIG. 1, before determining the first MIS based on the principal identifier assignment (e.g., before time period 201A). In such examples, mobile devices 220 may concurrently determine the first and second MISs based on the principal and alternative identifier assignments, respectively.

In the example of FIG. 2, the determination of the second MIS, concurrent with the determination of the first MIS, may proceed in the following manner, as shown by the series of block diagrams 204. During time period 201A, target mobile device 100 and mobile device 108 may each determine that it has no higher neighbors and therefore declare itself to be a member of the second MIS. After declaring itself to be member, each of target mobile device 100 and mobile device 108 may provide its MIS status (i.e., member) to its lower neighbors. For example, target mobile device 100 may provide a status communication 281 to mobile device 102 and a status communication 283 to mobile device 104, each indicating that target mobile device 100 is a member. Additionally, mobile device 108 may provide a status communication 285 to mobile device 103 indicating that mobile device 108 is a member.

In such examples, during time period 201B, mobile devices 102, 104, and 106 may each declare itself to be a constituent in response to status communications 281, 283, and 285, respectively. Further, each of mobile devices 102 and 104 may provide a status communication to each of its lower neighbors after determining its status. In such examples, mobile devices 102 and 104 may provide status communications 287 and 289, respectively, to mobile device 106. However, as noted above, mobile device 106 has already declared itself to be a constituent, so mobile device 106 does not declare itself to be a member in response to status communications 287 and 298. After time period 201B, the determination of the second MIS is complete, with the MIS members being mobile devices 100 and 108 and the other mobile devices being constituents.

As shown in FIG. 2, performing distributed determinations of two MISs of a plurality of mobile devices 220, in the manner described above in relation to FIG. 1, based on two different identifier assignments produces two different MISs. In other examples, performing the distributed determination on different identifier assignments may yield MISs of different sizes. For example, MISs having two members each are determined based on the principal and alternative identifier assignments of the example of FIG. 2. However, an MISs having three members may be determined based on an identifier assignment having identifiers 1, 3, 2, 0, and 4 for mobile devices 100, 102, 104, 106, and 108. As such, in examples in which a plurality of MISs are determined for a plurality of mobile devices, the resulting MISs may have different sizes. In such examples, the smallest MIS of the plurality of MISs may be selected by an MIS selector, as described above in relation to FIG. 1. Moreover, the sizes of different MISs of a plurality of mobile devices may vary widely. For example, a graph of a number "N" mobile devices may resemble a hub-and-spokes arrangement in which one of the mobile devices is a hub and the only edges in the graph are N−1 edges between the hub mobile device and the remaining N−1 mobile devices, respectively. In such examples, one MIS of the mobile devices has a size of one (i.e., only the hub mobile device is a member), and another MIS may has a size of N−1 (i.e., each mobile device except the hub is a member).

Additionally, when determining first and second MISs concurrently, as in the example of FIG. 2, status communication for different MIS determinations can be combined in some cases. For example, when determining the first and second MISs of FIG. 2, during time period 201A, status communication 280 for the determination of the first MIS and status communication 281 for the determination of the second MIS may be provided from mobile device 100 to mobile device 102 in a single communication. Similarly, status communications 282 and 283 may be provided in one communication. Additionally, during time period 201B, status communications 284 and 287 may be provided in one communication, and status communications 286 and 289 may be provided in one communication. In such examples, combining status communications for multiple MIS determination may make the concurrent distributed determinations of multiple MISs faster and more efficient.

Figure 3:
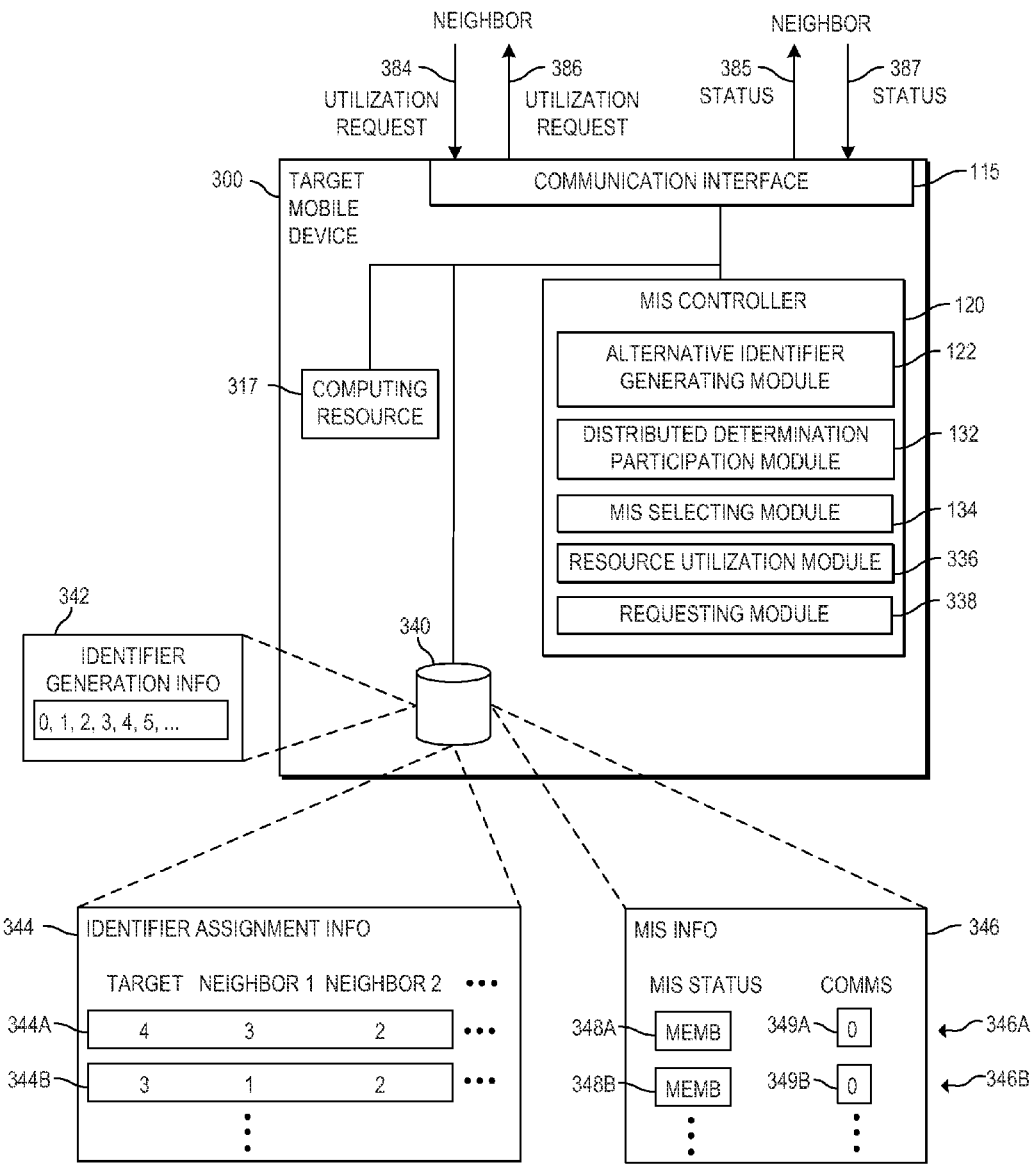
FIG. 3 is a block diagram of an example target mobile device to store information regarding distributed MIS determinations.

FIG. 3 is a block diagram of an example target mobile device 300 to store information regarding distributed MIS determinations. In the example of FIG. 3, target mobile device 300 includes communication interface 115 and MIS controller 120 described above in relation to FIG. 1. In addition to modules 122, 132, and 134 described above, MIS controller 120 includes additional modules 336 and 338 in the example of FIG. 3. Target mobile device 300 also includes a computing resource 317 and a storage area 340.

As used herein, a "computing resource" may be a component of a mobile device (e.g., a GPS interface, a wireless network interface, etc.), a functionality of a mobile device (e.g., GPS functionalities, wireless network communications, etc.), and/or a set of machine-readable instructions executable by a mobile device. In some examples, the computing resource may consume power at a high rate. For example, the computing resource may consume power at a higher rate than low-power communication (e.g., short-range radio communication). Additionally, as used herein, a "storage area" may comprise a number of physical media for storing data, such as at least one hard disk, solid state drive, tape drive, and the like, or any combination thereof. Additionally, any storage area described herein may include a plurality of storage devices that, in combination, form a pool of available storage.

In the example of FIG. 3, identifier generation information 342 may be stored in storage area 340. Identifier generation information 342 may be, for example, a list of numbers which may be used by module 122 as salts for the generation of alternative identifiers as described above in relation to FIG. 1. Additionally, identifier assignment information 344 may be stored in storage area 340. Identifier assignment information 344 may include the identifiers for target mobile device 300 and its neighbors for at least one identifier assignment. In some examples, identifier assignment information 344 may initially include principal identifiers 344A for mobile device 300 and its neighbors for a principal identifier assignment. In such examples, module 122 may store any alternative identifiers it generates in storage area 340 as part of identifier assignment information 344. For example, module 122 may generate and store alternative identifiers 344B for mobile device 300 and its neighbors for an alternative identifier assignment in storage area 340 as part of identifier assignment information 344. In the example of FIG. 3, identifier assignment information 344 includes identifiers 344A and 344B, for two different identifier assignments, for mobile device 300 and two of its neighbors. In other examples, identifier assignment information 344 may include identifiers for more or fewer neighbors and/or for more than two identifier assignments.

In some examples, target mobile device 300 may participate in concurrent distributed determinations of a plurality of MISs based on a plurality of identifier assignments, respectively, as described above in relation to FIG. 1. In such examples, an MIS is determined for each of the identifier assignments, and mobile device 300 may store, in storage area 340, MIS information 346, which may include MIS decision information 346A, 346B, etc., for each of the identifier assignments. In such examples, target mobile device 300 may maintain the MIS decision information for each identifier assignment as target mobile device 300 participates in the distributed determinations of MISs based on the identifier assignments.

In the example of FIG. 3, target mobile device 300 may participate in concurrent distributed determinations of first and second MISs based on the principal and alternative identifier assignments, respectively. In such examples, to participate in the distributed determinations of the first and second MISs, module 132 may store, for each of the identifier assignments, a current MIS status for target mobile device 300 and a number of outstanding status communications for target mobile device 300. In the example of FIG. 3, MIS information 346 includes MIS decision information 346A for the principal identifier assignment, including an MIS status 348A of target mobile device 300 for the principal identifier assignment, and a number of outstanding status communications 349A for target mobile device 300 for the principal identifier assignment. Similarly, MIS information 346 includes MIS decision information 346B for the alternative identifier assignment, including an MIS status 348B and a number of outstanding status communications 349B for target mobile device 300 for the alternative identifier assignment.

In some examples, for each identifier assignment, each of a mobile device's neighbors may be a sending neighbor or a receiving neighbor. As used herein, a "sending neighbor" of a mobile device for a given identifier assignment is a neighbor that is to provide a status communication to the mobile device in the distributed determination of an MIS based on the given identifier assignment. Also, as used herein, a "receiving neighbor" of a mobile device for a given identifier assignment is a neighbor that is to receive a status communication from the mobile device in the distributed determination of an MIS based on the given identifier assignment. In examples in which higher neighbors provide status communications to lower neighbors, higher neighbors of the mobile device may be sending neighbors for the mobile device while lower neighbors may be receiving neighbors. In examples in which lower neighbors provide status communications to higher neighbors, lower neighbors may be sending neighbors of the mobile device while higher neighbors may be receiving neighbors of the mobile device. In the example of FIG. 3, the number of outstanding status communications for a given identifier assignment may initially be the number of sending neighbors for mobile device 300, and that number may be decremented each time mobile device 300 receives a status communication from one of its sending neighbors.

Moreover, in the example of FIG. 3, to participate the in the distributed determinations of the first and second MISs, module 132 may further, for each of the identifier assignments, receive status communications from sending neighbors, update the MIS status for mobile device 300, and provide status communications to receiving neighbors of mobile device 300. For example, for each of the identifier assignments, module 132 may receive, from each sending neighbor (if any), a status communication 387 via communication interface 115, and may update the MIS status and/or the number of outstanding status communications in accordance with the status communication. For example, if the status communication indicates the status of a sending neighbor for the principal identifier assignment, module 132 may decrement the number of outstanding status communications 349A for the principal identifier assignment in response to status communication 387. In some examples, module 132 may also update the MIS status 348A of mobile device 300 for the principal identifier assignment if the number of outstanding status communications has reached zero (e.g., declare itself to be a member of the MIS) or if the communication indicates that the sending neighbor is a member of the MIS for the principal identifier assignment.

Additionally, in some examples, for each of the identifier assignments, module 132 may provide the MIS status of target mobile device 300, once declared, to a receiving neighbor (if any exist) for that identifier assignment. In such examples, module 132 may provide the MIS status to a receiving neighbor via a status communication 385 with communication interface 115. For example, if target mobile device 300 declares itself to be a member of an MIS based on the principal identifier assignment, target mobile device 300 may provide its MIS status 348A for the principal identifier assignment to each of its receiving neighbors for the principal identifier assignment, if any exist.

After the determinations of the first and second MISs, module 134 may select one of the MISs as a set of representatives for the plurality of mobile devices in any suitable manner. For example, module 134 may select one of the MISs as described above in relation to FIG. 1. In other examples, the determined MISs may have an order and module 134 may select the MIS that is first in the order of the MISs. In such examples, more than two MISs of the mobile devices may be determined, and the plurality of mobile devices may cycle through the MISs in order. In this manner, the mobile devices may share the burden (e.g., power consumption, etc.) of being a representative among the plurality of mobile devices. For example, after selecting the MIS that is the first in the order, module 134 may select the next MIS in the order after a given time period has elapsed, returning to the MIS that is first in the order after selecting each of the other MISs.

Target mobile device 300 may know whether it is a member of the selected MIS based on the MIS status stored in MIS information 346 for each of the MISs. In some examples, if target mobile device 300 is a member of the selected MIS, resource utilization module 336 may receive, from a neighbor via communication interface 115, a request 384 to utilize computing resource 317 of mobile device 300. In such examples, module 336 may utilize computing resource 317 in accordance with the request 384. For example, computing resource 317 may be a GPS interface, and request 384 may be a request to obtain information from (or otherwise communicate with) a GPS satellite. In such examples, module 336 may utilize computing resource 317 to obtain the information from the GPS satellite and provide the obtained information to the neighbor. Additionally, in some examples, target mobile device 300 may cache the received information and provide the cached information to a neighbor in response to a similar request 384.

In other examples, if target mobile device 300 is not a member (i.e., is a constituent) of the selected MIS, requesting module 338 may provide, to a neighbor that is a member of the selected MIS via communication interface 115, a request 386 to utilize a computing resource of the neighbor. In such examples, mobile device 300 may receive a result of the computing resource utilization from the neighbor. Additionally, in some examples, target mobile device 300 may begin performing tasks of a representative or constituent after declaring its MIS status for a given identifier assignment, without waiting for the entire MIS determination to be completed for that identifier assignment. For example, in examples in which module 134 selects successive MISs according to an order of the MISs, after target mobile device 300 declares its MIS status for the MIS that is first in the order, target mobile device 300 may begin performing tasks as a representative or constituent based on the declared MIS status. In such examples, if target mobile device 300 declares itself to be a member of the MIS that is first in the order, module 336 may begin receiving resource requests and utilizing computing resource 317 in response to such requests. Also, in such examples, if target mobile device 300 declares itself to be a constituent of the MIS that is first in the order, module 338 may begin sending resource utilization requests to a neighbor declared to be a member of the MIS, without waiting for the entire MIS to be determined.

Figure 4:
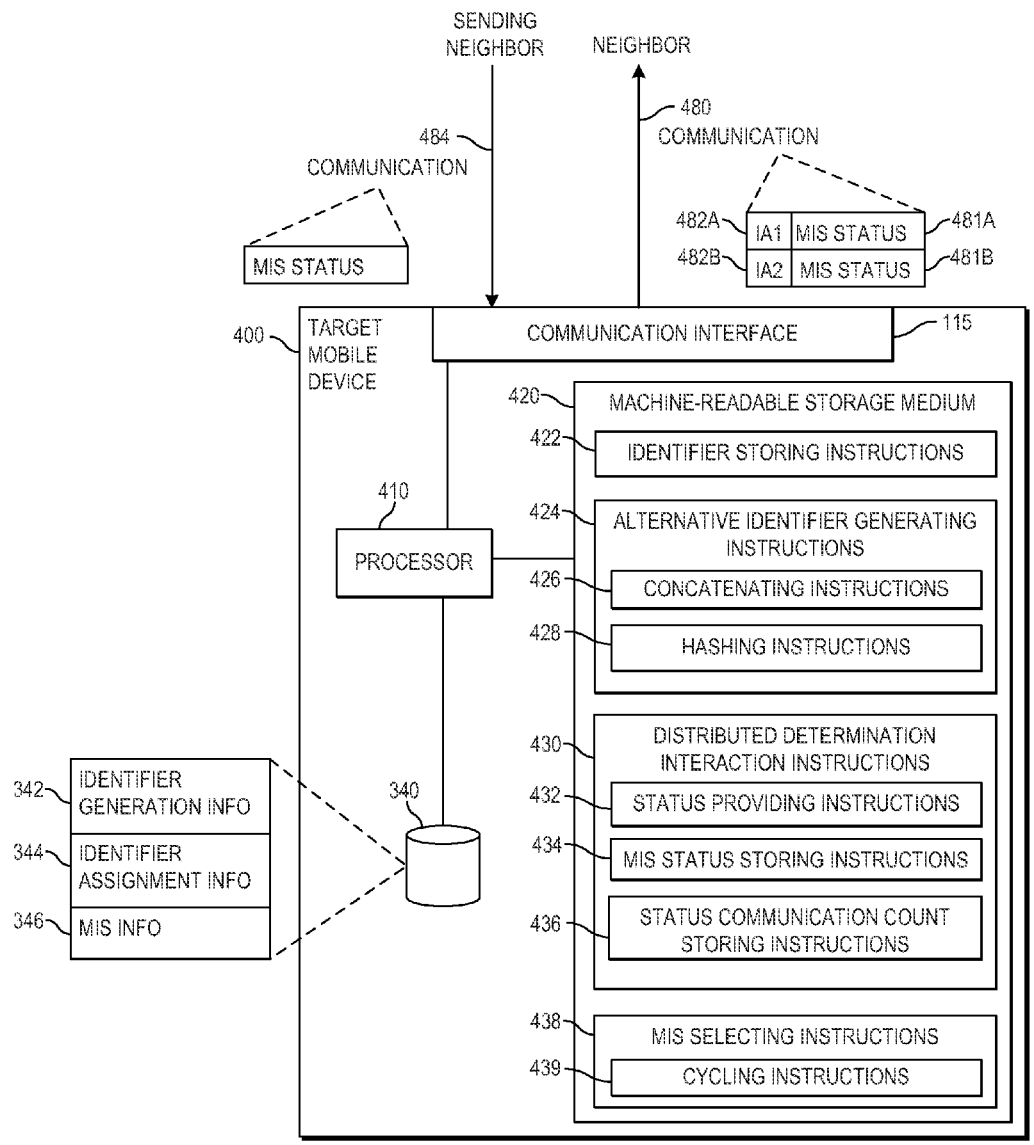
FIG. 4 is a block diagram of another example target mobile device to interact with a neighbor mobile device to contribute to distributed determinations of a plurality of MISs.

FIG. 4 is a block diagram of another example target mobile device 400 to interact with a neighbor mobile device to contribute to distributed determinations of a plurality of MISs. In the example of FIG. 4, target mobile device 400 includes a communication interface 115, a storage area 340, a processor 410, and a machine-readable storage medium 420. In some examples, storage area 340 may include identifier generation information 342, identifier assignment information 344, and MIS information described above in relation to FIG. 3. Additionally, in the example of FIG. 4, target mobile device 400 is one of a plurality of mobile devices.

As used herein, a "machine-readable storage medium" may be any electronic, magnetic, optical, or other physical storage device that contains, stores, or is otherwise encoded with executable instructions. For example, any machine-readable storage medium described herein may be any of Random Access Memory (RAM), flash memory, a storage drive (e.g. a hard disk), a Compact Disc Read Only Memory (CD-ROM), and the like, or a combination thereof. Further, any machine-readable storage medium described herein may be non-transitory. Additionally, as used herein, a "processor" may be at least one central processing unit (CPU), at least one semiconductor-based microprocessor, at least one graphics processing unit (GPU), at least one other hardware device suitable for the retrieval and execution of instructions stored on a machine-readable storage medium, or a combination thereof.

Machine-readable storage medium 420 includes instructions 422, 424, 426, 428, 430, 432, 434, 436, and 438. In the example of FIG. 4, processor 410 may fetch, decode, and execute the instructions of machine-readable storage medium 420 to implement the functionality described herein. As an alternative or in addition to fetching, decoding, and executing instructions, processor 410 may include at least one integrated circuit (IC), at least one other electronic circuit, other control logic, or a combination thereof for performing some or all of the functionality of the instructions of machine-readable storage medium 420 described herein.

In the example of FIG. 4, instructions 422 may store a principal identifier for each of target mobile device 400 and at least one neighbor of target mobile device 400. In such examples, the principal identifiers may be part of a principal identifier assignment for the plurality of mobile devices. In some examples, instructions 422 may store the principal identifiers in storage area 340 as part of identifier assignment information 344. In some examples, after storing the principal identifiers, alternative identifier generating instructions 424 may generate a plurality of alternative identifiers. In such examples, the plurality of alternative identifiers may include at least one alternative identifier for target mobile device 400 and at least one alternative identifier for each of the neighbors of target mobile device 400. In some examples, the alternative identifiers may include identifiers for each of a plurality of alternative identifier assignments. In such examples, instructions 424 may generate, for each of the plurality of alternative identifier assignments, an alternative identifier for target mobile device 400 and the neighbors of mobile device 400.

In some examples, instructions 424 may generate the alternative identifiers based on identifier generation information 342 and the principal identifiers. In such examples, identifier generation information 342 may include a plurality of modifiers (e.g., numbers), each of which is associated with one of the plurality of alternative identifier assignments, respectively. In the example of FIG. 4, instructions 424 may include concatenating instructions 426 and hashing instructions 428. In such examples, instructions 426 may concatenate one of the modifiers with each of the primary identifiers to generate a plurality of salted identifiers, and instructions 428 may take a hash of each of the salted identifiers to generate the alternative identifiers. In some examples, instructions 426 and 428 may repeat the process described above for each of a plurality of alternative identifier assignments using a different modifiers for each of the alternative identifier assignments. As used herein, to "take a hash" of a value means to input the value to a hash function and obtain a hash value output by the hash function in response to the input value.

In the example of FIG. 4, machine-readable storage medium 420 further includes instructions 430 to cause target mobile device 400 to interact with at least one neighbor to contribute to concurrent distributed determinations, by the plurality of mobile devices, of a plurality of MISs of the plurality of mobile devices based on a collection of identifier assignments. In some examples, the collection of identifier assignments includes the principal identifier assignment and the plurality of alternative identifier assignments. In the example of FIG. 4, the concurrent distributed determinations of the plurality of MISs by the plurality of mobile devices may proceed as described above in relation to FIGS. 1 and 2.

In some examples, instructions 430 may cause target mobile device 400 to interact with the at least one neighbor by awaiting status communications 484 from its sending neighbors (if any), and providing status communications to its receiving neighbors (if any) once its status is determined, for each identifier assignment of the collection of identifier assignments. In such examples, instructions 430 may also cause target mobile device 400 to declare its MIS status (i.e., member or constituent) based on the MIS status of at least one of its sending neighbors (if any) for each of the identifier assignments.

Additionally, in some examples, instructions 430 may combine status communications for different identifier assignments into a single communication, as described above in relation to FIG. 2. In such examples, instructions 430 may include status providing instructions 432 which may cause target mobile device 400 to provide a combined status communication 480 to a neighbor. The combined status communication may include, for example, a first MIS status 481A of target mobile device 300 for a first identifier assignment of the collection of identifier assignments, and a second MIS status 481B of target mobile device 300 for a second identifier assignment of the collection of identifier assignments. In such examples, the combined status communication 480 may also include information indicating which identifier assignments the MIS statuses are associated with. For example, the combined status communication 480 may include an indication 482A ("IA1") that first MIS status 481A is associated with the first identifier assignment, and an indication 482B ("IA2") that the second MIS status 481B is associated with the second identifier assignment. In such examples, the indications 482A and 482B may be metadata included in the combined status communication.

In some examples, instructions 430 may also include MIS status storing instructions 434 and status communication count storing instructions 436. In such examples, instructions 434 may cause target mobile device 400 to store an MIS status for target mobile device 400 for each of the collection of identifier assignments. Additionally, in such examples, instructions 436 may cause target mobile device 400 to store a number of outstanding status communications for target mobile device 400 for each of the collection of identifier assignments. In such examples, instructions 434 and 436 may store the MIS statuses and numbers of outstanding status communications in storage area 340 as part of MIS information 346.

In the example of FIG. 4, machine-readable storage medium 420 may further include MIS selecting instructions 438. In such examples, after the plurality of MISs have been determined for the plurality of mobile devices, instructions 438 may select one of the MISs as a set of representatives in any manner described above in relation FIGS. 1 and/or 3. In some examples, the plurality of MISs may have an order, and instructions 438 may select the MIS that is first in the order of the MISs. In such examples, instructions 438 may periodically select a new MIS of the plurality in response to a selection trigger, such as, for example, an indication received from another mobile device, the passage of a given amount of time, or the like. In such examples, instructions 438 may include cycling instructions 439 that may select the next MIS in the order in response to a selection trigger to thereby cycle through the plurality of MISs in order (and returning to the first MIS after the selection of the last MIS), in response to successive selection triggers.

Figure 5:
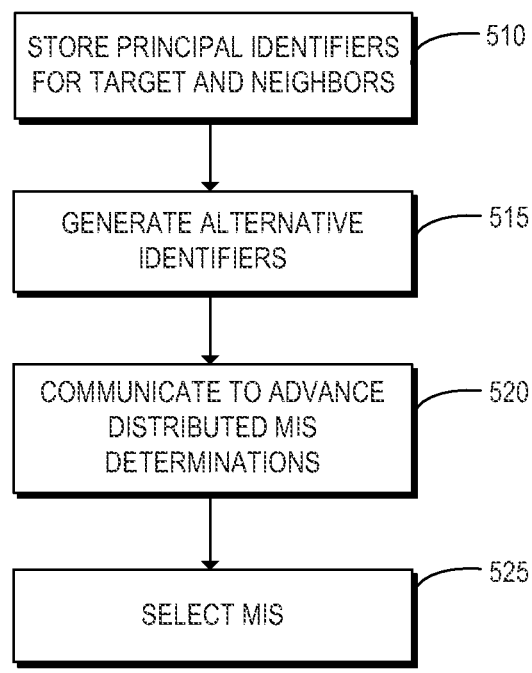
FIG. 5 is a flowchart of an example method for communicating with a neighbor mobile device for the determination of a plurality of MISs.

FIG. 5 is a flowchart of an example method 500 for communicating with a neighbor mobile device for the determination of a plurality of MISs. Although execution of method 500 is described below with reference to target mobile device 100 of FIG. 1, other suitable components for the execution of method 500 can be utilized (e.g., target mobile devices 300 or 400). Additionally, method 500 may be implemented in the form of executable instructions encoded on a machine-readable storage medium, in the form of electronic circuitry, or a combination thereof. In some examples, target mobile device 100 may be one of a plurality of mobile devices.

Method 500 may start at 510, where target mobile device 100 may store a principal identifier for target mobile device 100 and a principal identifier for each neighbor of target mobile device 100, wherein each of the neighbors is also part of the plurality of mobile devices. After storing the principal identifiers, method 500 may proceed to 515, where target mobile device 100 may generate a plurality of alternative identifiers. In some examples, the plurality of alternative identifiers may include an alternative identifier for target mobile device 100 and for each of its neighbors, for each of a plurality of alternative identifier assignments. In such examples, the alternative identifiers may be generated based on identifier generation information and the principal identifiers.

After generating the alternative identifiers, method 500 may proceed to 520, where target mobile device 100 may communicate with each of its neighbors to advance concurrent distributed determinations, by the plurality of mobile devices, of a plurality of MISs of the plurality of mobile devices based on at least the alternative identifier assignments. In some examples, the plurality of MISs may be determined based on the alternative identifier assignments and the principal identifier assignment. In some examples, target mobile device 100 may communicate to advance the MIS determinations by receiving status communications from its sending neighbors (if any) for each identifier assignment, and providing its MIS status to its receiving neighbors (if any) once its status is determined for each identifier assignment.

After communicating with its neighbors, method 500 may proceed to 525, where target mobile device 100 may select an MIS of the plurality of MISs determined by the plurality of mobile devices as a set of representatives. In some examples, target mobile device 100 may select the MIS based on at least one feature of each of the plurality of MISs. In some examples, the feature information may be the number of members in (i.e., a size of) each of the MISs, which target mobile device 100 may determine as described in relation to FIG. 1. In other examples, the plurality of MISs may have an order, and target mobile device 100 may select the first MIS according to the order.

Figure 6:
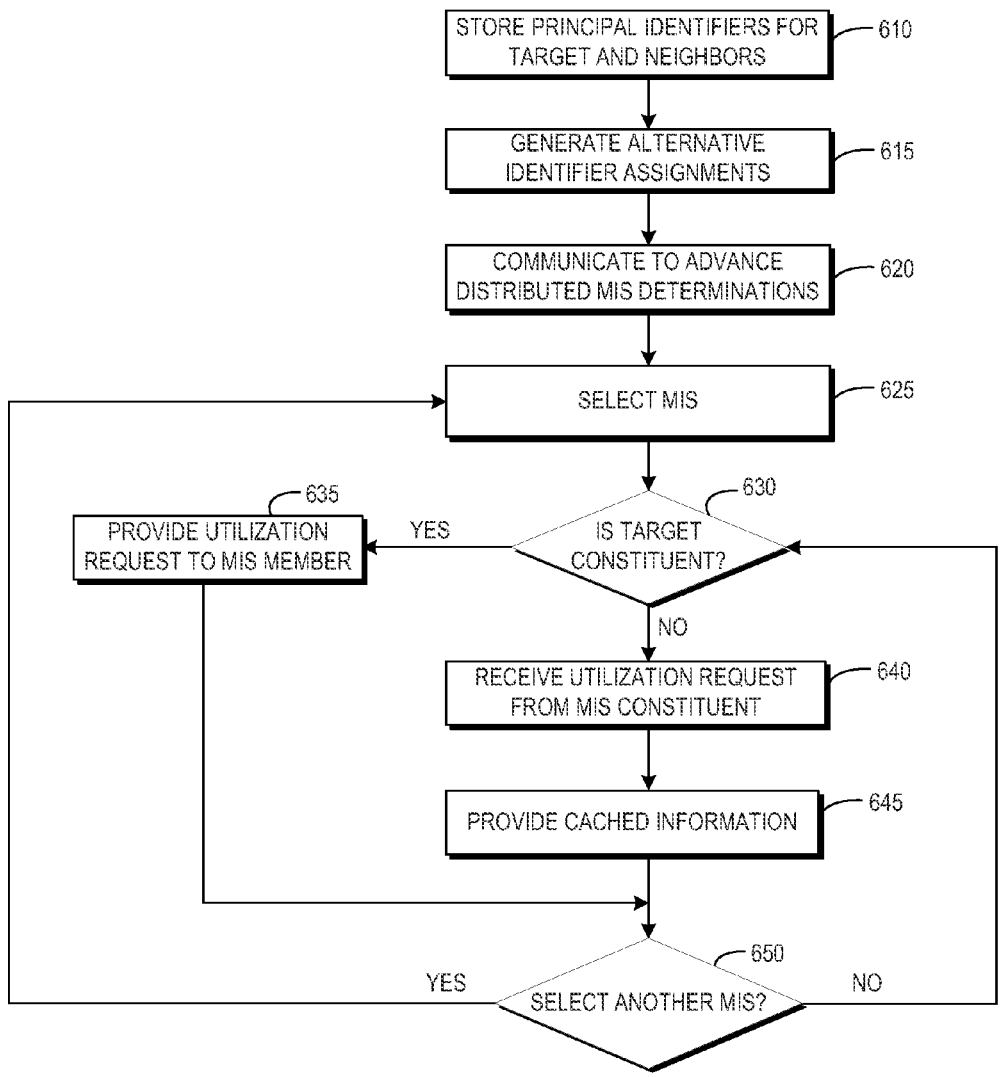
FIG. 6 is a flowchart of an example method for selecting MISs of a plurality of MISs of mobile devices.

FIG. 6 is a flowchart of an example method 600 for selecting MISs of a plurality of MISs of mobile devices. Although execution of method 600 is described below with reference to target mobile device 100 of FIG. 1, other suitable components for execution of method 600 can be utilized (e.g., target mobile device 300 or 400). Additionally, method 600 may be implemented in the form of executable instructions stored on a machine-readable storage medium, in the form of electronic circuitry, or a combination thereof. In some examples, target mobile device 100 may be one of a plurality of mobile devices.

Method 600 may start at 610, where target mobile device 100 may store a principal identifier for target mobile device 100 and each of its neighbors, wherein each of its neighbors is also part of the plurality of mobile devices. The principal identifiers may each be part of a principal identifier assignment. After storing the principal identifiers, method 600 may proceed to 615, where target mobile device 100 may generate a plurality of alternative identifiers based on identifier generation information and the principal identifiers, in any manner described above. Method 600 may then proceed to 620, where target mobile device 100 may communicate with each of its neighbors to advance concurrent distributed determinations, by the plurality of mobile devices, of a plurality of MISs of the plurality of mobile devices based on at least the alternative identifier assignments as described above in relation to FIG. 5. In some examples, the MIS may be determined based on the alternative identifier assignments and the principal identifier assignment. Method 600 may then proceed to 625, where target mobile device 100 may select a first MIS, of the plurality of MISs determined by the plurality mobile devices. In some examples, target mobile device 100 may select a first MIS based on at least the number of members in each of the plurality of MISs. In such examples, target mobile device 100 may obtain the number of members in each of the MISs as described above in relation to FIG. 1. In other examples, the plurality of MISs may have an order, and target mobile device 100 may select, as the first MIS, the MIS that is first in the order of the MISs.

After selecting a first MIS, method 600 may proceed to 630, where target mobile device 100 may determine whether it is a member or a constituent of the first MIS. If target mobile device 100 is a constituent of the first MIS, then method 600 may proceed to 635, where target mobile device 100 may provide, to a member of the first MIS, a request to utilize a computing resource of the member (i.e., the representative). In such examples, the member may utilize the computing resource and provide a result (e.g., information obtained) to target mobile device 100 in response to the request. Method 600 may then proceed to 650.

If target mobile device 100 is not a constituent (i.e., is a member) of the first MIS, method 600 may proceed to 640, where target mobile device 100 may receive, from a constituent of the MIS, a request to utilize a computing resource of target mobile device 100. In some examples, target mobile device 100 may utilize the computing resource (e.g., a GPS interface) in response to the utilization request. In such examples, if target mobile device 100 obtains information in response to utilizing the computing resource (e.g., receives information from a GPS satellite), target mobile device 100 may provide this information to the constituent. In some examples, when target mobile device 100 obtains information (e.g., GPS position, weather, time, etc.) via the computing resource, it may cache the information. In such examples, after receiving the utilization request at 640, method 600 may proceed to 645, where target mobile device 100 may provide cached information to the constituent in response to the resource utilization request received from the constituent at 640.

After providing the cached information, method 600 may proceed to 650, where target mobile device 100 may determine whether to select another MIS of the plurality of MISs. In some examples, target mobile device 100 may determine to select another MIS after a given period of time has elapsed since selecting the first MIS. In other examples, target mobile device 100 may determine to select another MIS in response to receiving an indication to select another MIS. In some examples, the indication may be received from a user of target mobile device 100 via a user interface or from another mobile device of the plurality of mobile devices.

If target mobile device 100 determines at 650 not to select another MIS, method 600 may proceed to 630. If target mobile device 100 determines to select another MIS, then method 600 may proceed to 625, where target mobile device 100 may select a second MIS of the plurality of MISs as a second set of representatives for the plurality of mobile devices. In such examples, target mobile device 100 may select the second MIS based on features of the plurality of MISs. For example, the features may be the number of members in (i.e., the size of) each of the MISs. In other examples, any other suitable features or characteristics of the MISs may be used to select the second MIS. For example, target mobile device 100 may select, as the second MIS, an MIS of the plurality of MISs having the fewest number of members in common with the first MIS. In such examples, target mobile device 100 may select an MIS having the fewest number of members in common with the first MIS as described above in relation to FIG. 1.

Alternatively, in examples in which the plurality of MISs have an order, target mobile device 100 may select, as the second MIS, the MIS that is second in the order of the MISs. In such examples, target mobile device 100 may cycle through the MISs in order by continually selecting the next MIS after the passage of a given amount of time (or any other selection trigger), and returning to the first MIS after selecting the last MIS in the order.

What is claimed is:

1. A target mobile device, of a plurality of mobile devices, comprising:
    a communication interface to communicate with at least one neighbor mobile device of the plurality of mobile devices, wherein the target and neighbor mobile devices each have a first identifier of a first identifier assignment for the plurality of mobile devices; and
    a maximal independent set (MIS) controller to:
        generate, based on at least identifier generation information, a second identifier for each of the target and neighbor mobile devices, wherein the second identifiers are part of a second identifier assignment for the plurality of mobile devices;
        participate, with the other of the plurality of mobile devices via the communication interface, in concurrent distributed determinations of first and second MISs of the plurality of mobile devices based on the first and second identifier assignments, respectively; and
        select one of the first and second MISs as a set of representatives.

2. The target mobile device of claim 1, wherein the MIS controller is to:
    select one of the first and second MISs based on a selection communication received, via the communication interface, from one of the at least one neighbor mobile devices.

3. The target mobile device of claim 1, further comprising:
    a computing resource; and
    wherein the MIS controller is further to:
        utilize the computing resource in response to a utilization request from one of the at least one neighbor mobile devices, if the target mobile device is a member of the selected MIS; and
        provide a utilization request to a member of the selected MIS, if the target mobile device is a constituent of the selected MIS.

4. The target mobile device of claim 1, wherein, to participate in the distributed determination of the first and second MISs, the MIS controller is to, for each of the identifier assignments:
    store an MIS status for the target mobile device;
    store a number of outstanding status communications for the target mobile device; and
    provide the MIS status to a receiving neighbor of the at least one neighbor mobile devices.

5. The target mobile device of claim 4, wherein, to participate in the distributed determination of the first and second MISs, the MIS controller is further to, for each of the identifier assignments:
    receive, from a sending neighbor mobile device of the at least one neighbor mobile device via the communication interface, a status communication; and
    update at least one of the MIS status and the number of outstanding status communications in accordance with the received status communication.

6. A non-transitory machine-readable storage medium encoded with instructions executable by a processor of a target mobile device of a plurality of mobile devices, the storage medium comprising:
    instructions to store a principal identifier for each of the target mobile device and at least one neighbor mobile device of the plurality of mobile devices, wherein the principal identifiers are part of a principal identifier assignment;
    instructions to generate, based on identifier generation information and the principal identifiers, a plurality of alternative identifiers including, for each of a plurality of alternative identifier assignments, alternative identifiers for the target and neighbor mobile devices;
    instructions to cause the target mobile device to interact with the at least one neighbor mobile device to contribute to concurrent distributed determinations, by the plurality of mobile devices, of a plurality of maximal independent sets (MISs) of the plurality of mobile devices based on a collection of identifier assignments including the alternative identifier assignments and the principal identifier assignment; and
    instructions to select one of the plurality of MISs as a set of representatives.

7. The machine-readable storage medium of claim 6, wherein the instructions to cause the target mobile device to interact with the at least one neighbor mobile device comprise:
    instructions to provide, from the target mobile device to one of the at least one neighbor mobile devices, a combined status communication including first and second MIS statuses for first and second identifier assignments of the collection of identifier assignments, respectively.

8. The machine-readable storage medium of claim 7, wherein the combined status communication includes an indication that the first MIS status is associated with the first identifier assignment and an indication that the second MIS status is associated with the second identifier assignment.

9. The machine-readable storage medium of claim 6, wherein:
    the plurality of MISs have an order;
    the instructions to select one of the plurality of MISs comprise instructions to cycle through the plurality of MISs, in order, in response to successive selection triggers; and
    the instructions to cause the target mobile device to interact with the at least one neighbor mobile device comprise:
        instructions to store an MIS status for the target mobile device for each of the collection of identifier assignments; and
        instructions to store a number of outstanding status communications for the target mobile device for each of the collection of identifier assignments.

10. The machine-readable storage medium of claim 6, wherein the identifier generation information includes a plurality of modifiers each associated with one of the alternative identifier assignments, and wherein, the instructions to generate the alternative identifiers comprise:
    instructions to concatenate one of the plurality of modifiers with each of the primary identifiers to generate a plurality of salted identifiers, for each of the alternative identifier assignments; and instructions to take a hash of each of the salted identifiers to generate the alternative identifiers for the target and neighbor mobile devices, for each of the alternative identifier assignments.

11. A method comprising:

storing, on a target mobile device of a plurality of mobile devices, a principal identifier for each of the target mobile device and at least one neighbor mobile device of the plurality of mobile devices;

generating, with the target mobile device based on identifier generation information and the principal identifiers, a plurality of alternative identifiers including, for each of a plurality of alternative identifier assignments, an alternative identifier for each of the target and neighbor mobile devices;

communicating with each of the at least one neighbor mobile devices, after generating the alternative identifiers, to advance concurrent distributed determinations, by the plurality of mobile devices, of a plurality of maximal independent sets (MISs) of the plurality of mobile devices based on at least the alternative identifier assignments; and selecting a first MIS of the plurality of MISs as a first set of representatives.

12. The method of claim 11, wherein selecting the first MIS comprises:

selecting the first MIS based on at least the number of members in each of the plurality of MISs.

13. The method of claim 11, further comprising:

providing a resource utilization request to a member of the first MIS, if the target mobile device is a constituent of the first MIS;

receiving a resource utilization request from a constituent of the first MIS, if the target mobile device is a member of the first MIS; and providing cached information to the constituent in response to receiving the resource utilization request.

14. The method of claim 11, further comprising:

determining whether to select another MIS of the plurality of MISs; and selecting a second MIS of the plurality of MISs as a second set of representatives for the plurality of mobile devices, if the result of the determination is to select another MIS.

15. The method of claim 14, wherein selecting the second MIS comprises:

selecting, as the second MIS, an MIS of the plurality of MISs having the fewest number of members in common with the first MIS.

* * * * *